(12) United States Patent
Finkenzeller et al.

(10) Patent No.: US 8,544,733 B2
(45) Date of Patent: Oct. 1, 2013

(54) METHOD AND APPARATUS FOR PERSONALIZING PORTABLE DATA STORAGE MEDIA

(75) Inventors: Klaus Finkenzeller, Unterföhring (DE); Bernd Brus, Ottobrunn (DE); Thomas Goetz, Markt Schwaben (DE); Werner Mathé, Maisach (DE); Carles Barrobés I Meix, Barcelona (ES); Uwe Kapp, Trossingen (DE); Richard Bosch, Neusäss/Steppach (DE)

(73) Assignee: Giesecke & Devrient Gmbh, Munich (DE)

( * ) Notice: Subject to any disclaimer, the term of this patent is extended or adjusted under 35 U.S.C. 154(b) by 547 days.

(21) Appl. No.: 12/298,867

(22) PCT Filed: Apr. 27, 2007

(86) PCT No.: PCT/EP2007/003774
§ 371 (c)(1),
(2), (4) Date: Mar. 10, 2009

(87) PCT Pub. No.: WO2007/124939
PCT Pub. Date: Nov. 8, 2007

(65) Prior Publication Data
US 2009/0236414 A1 Sep. 24, 2009

(30) Foreign Application Priority Data

Apr. 28, 2006 (DE) .......................... 10 2006 019 809
May 23, 2006 (DE) .......................... 10 2006 024 106
Jul. 26, 2006 (DE) .......................... 10 2006 034 558

(51) Int. Cl.
*G06K 5/00* (2006.01)
(52) U.S. Cl.
USPC ....................................................... 235/380

(58) Field of Classification Search
USPC ........................................................ 235/380
See application file for complete search history.

(56) References Cited

U.S. PATENT DOCUMENTS 5,378,884 A * 1/1995 Lundstrom et al. ........... 235/441
5,554,974 A * 9/1996 Brady et al. ............... 340/572.6
(Continued)

FOREIGN PATENT DOCUMENTS

| DE | 19641892 A1 | 4/1998 |
| DE | 19958559 A1 | 6/2001 |
| EP | 1011071 A2 | 6/2000 |

OTHER PUBLICATIONS

International Search Report in PCT/EP2007/003774, Sep. 7, 2007.

*Primary Examiner* — Michael G Lee
*Assistant Examiner* — David Tardif
(74) *Attorney, Agent, or Firm* — Bacon & Thomas, PLLC

(57) ABSTRACT

A method is suggested for the simultaneous personalization of several portable data carriers (2) respectively having at least one integrated circuit (6) for storing and/or processing information. According to the invention a unidirectional protocol serves for transmitting an identical personalization signal to several portable data carriers (2). These detect personalization data on this basis and store them in the integrated circuits (6). Preferably adapter elements (100; 101; 102) are used, which can accommodate at least one data carrier (50) and which are equipped with first interfaces (140; 150) for communicating with a reading device (20; 21; 22) and with second interfaces (120) for communicating with the accommodated data carrier (2). In a variant the portable data carriers (1) are transported in a transport device (600) which, at least temporarily, electrically contacts the contact area (9) of the portable data carriers (2) by means of a contacting unit (604).

48 Claims, 10 Drawing Sheets

(56) References Cited

U.S. PATENT DOCUMENTS

| | | | |
|---|---|---|---|
| 5,920,055 A * | 7/1999 | Roth et al. | 235/380 |
| 6,283,368 B1 * | 9/2001 | Ormerod et al. | 235/380 |
| 6,394,346 B1 * | 5/2002 | Bonneau et al. | 235/438 |
| 6,484,935 B1 | 11/2002 | Fischbacher | |
| 7,295,118 B2 * | 11/2007 | Jessup et al. | 340/572.1 |
| 2004/0073846 A1 * | 4/2004 | Nakanishi et al. | 714/42 |
| 2004/0220602 A1 * | 11/2004 | Deng et al. | 606/170 |
| 2005/0034889 A1 | 2/2005 | Mongin et al. | |
| 2005/0218212 A1 | 10/2005 | Berthe | |
| 2007/0075132 A1 * | 4/2007 | Kean | 235/380 |

* cited by examiner

METHOD AND APPARATUS FOR PERSONALIZING PORTABLE DATA STORAGE MEDIA

FIELD OF THE INVENTION

The invention relates to a method and an apparatus for personalizing portable data carriers. In particular the invention relates to the initialization of memory cards and processor cards such as chip cards, cellular phone cards and the like, by providing the data carriers with digital data, in particular by writing the data in nonvolatile memories, such as for example EEPROM or flash memories.

The invention furthermore relates to a method for processing portable data carriers. Moreover, the invention relates to a method for retrofitting a production facility for processing portable data carriers, a transport device for transporting at least one portable data carrier and a production facility for processing portable data carriers.

BACKGROUND

Depending on the applications for which a portable data carrier is to be used, various data and programs are stored in its memory. At least a part of these data or programs is written into a nonvolatile memory of the portable data carrier during or after the production of the portable data carrier. This writing process is usually referred to as personalization. The term "personalization" therein is used both as a generic term for writing any desired data and programs and as a special term for writing data which are individual for a portable data carrier. "Personalization" furthermore also includes measures carried out on the portable data carrier itself such as the labeling. However, such personalization measures fundamentally do not form part of the subject matter of the present invention.

For writing data and programs provided equally for several portable data carriers frequently also the term "initialization" is used. In a personalization the process of initializing represents a first of two steps of personalizing a data carrier. When the data carrier is initialized it is provided with general data which are identical for all data carriers of the same type. This type of personalization data will be referred to as initialization data in the following. In the second step, the "individualization", each data carrier is provided with individualization data, which contain for example such data which adapt the individual data carrier to the end customer.

Unless explicitly referring to the initialization, the term "personalization" shall always be understood to have its general meaning, which does not make any exact distinction according to the type of data written. In other words, the term "personalization" used below in principle encompasses both a personalization in the narrower sense and an initialization.

Accordingly, according to the state of the art (W. Rankl, W. Effing: Handbuch der Chipkarten. [Handbook of chip cards.] Munich[4], 2002), the personalization is usually carried out in two production steps, respectively executing the initialization and the individualization. This is most frequently done using different apparatus and methods. In the first step the identical initialization data are written into the data carriers to be personalized, in the second step the individualization data.

The process of initializing data carriers is a critical step within the overall production process of the data carriers, since the amount of time required for writing the initialization data into the nonvolatile memory is comparatively great and has a substantial influence on the production costs. For future generations of data carriers whose storage capacity will be substantially greater than today's, this problem will be exacerbated, since the amount of initialization data will grow.

There are initialization machines in which a plurality of data carriers can be initialized in parallel. However, for this purpose a corresponding number of reading devices is required for transmitting the initialization data, as each data carrier is initialized by means of one reading device. Likewise, one or several correspondingly arranged control devices are required for the reading devices, making these machines expensive. Consequently the degree of parallelization is comparatively small.

To increase the output it is known from DE 199 58 599 to provide a memory for taking up batch data sets for a plurality of chip cards, containing respectively uniform initialization data and uniform personalization data for each card. A batch of cards to be personalized is first initialized uniformly using the initialization data set. Subsequently the personalization data are transmitted card by card.

The initialization step can also be sped up by firstly initializing only one single data carrier in conventional fashion, by means of logical commands. Afterwards a memory image of the complete memory of this data carrier is generated and used for initializing the further data carriers of the same type with the aid of the physical memory addresses. Such a copy of the memory is called image, designating a copy of the original memory that is true to every bit. It contains more information than just the data stored in the memory of the master data carrier, such as the structure of the file system and the like. This makes it possible to produce ala exact, true-to-bit reproduction of the data carrier quickly, since direct use can be made of hardware functions and physical memory addresses.

In order to achieve a high output the personalization can generally be carried out with several portable data carriers at once. However, in the case of contactless portable data carriers a simultaneous data transmission between several portable data carriers and a personalization device can lead to data collisions and thereby to a loss of data on the transmission channel. This can be avoided by using an anti-collision algorithm, with the aid of which an individual portable data carrier can be selected among a plurality of contactless portable data carriers and can be addressed specifically. Such anti-collision algorithms are for example defined in the standards ISO/IEC 14443-3 or ISO/IEC 15693-3. However, using an anti-collision algorithm in carrying out the personalization has the disadvantage that the output is reduced again.

A data collision can also be prevented by spatially separating the portable data carriers. The spatial separation can be achieved in that the portable data carriers are singled and fed to the same writing-/reading device successively. However, this is again detrimental to the achievable output. Likewise it is possible to feed respectively one portable data carrier to several writing-/reading devices simultaneously. However, therein it is necessary to shield the individual writing-/reading devices from each other in regard of high-frequency in such a way that for each writing-/reading device communication is possible exclusively with one portable data carrier. Such shielding requires a relatively great effort. Furthermore, a great number of writing-/reading devices are required to achieve a high output.

In the personalization of contact-type portable data carriers similar problems occur. Thus the controlling of a plurality of writing-/reading devices leads to elaborate constructions and requires complex control software.

In the production of portable data carriers it is generally necessary to electrically contact the integrated circuits contained in the data carriers, for example in order to carry out tests or to write data into the integrated circuits. For this purpose a contacting device of a production machine is pressed against a contact field of the portable data carrier. The contact field has several contact surfaces, each of which is connected to a connector of the integrated circuit.

SUMMARY

It is the object of the invention to achieve a high output at a small effort in the personalization of portable data carriers. In particular it is the object of the invention to optimize the parallel initialization process and thereby decrease the production time and production costs. All in all, it is intended to render an efficient production of portable data carriers possible.

In the inventive method for personalizing portable data carriers a personalization signal is transmitted to a plurality of portable data carriers simultaneously. On the basis of the transmitted personalization signal personalization data are determined, which are stored in the integrated circuits of the portable data carriers. The present invention is in particular based on the basic concept of carrying out the initialization procedure on a plurality of portable data carriers in parallel by writing identical personalization data in a nonvolatile memory of the data carriers, the initialization taking place simultaneously or at least in a temporally overlapping fashion via a reading device that is shared by the data carriers. The use of one common reading device instead of numerous parallel reading devices is substantially more cost-effective, so that a greater number of data carriers can be initialized in parallel at the same expense. The production process is shortened correspondingly.

The invention has the advantage that a high output can be achieved with a comparatively small expenditure on equipment in the personalization procedure, in particular in the initialization of portable data carriers, since only one single signal source is required for personalizing several portable data carriers.

Within the framework of the inventive method it is in particular provided that the personalization signal is transmitted within the framework of a unidirectional signal transmission from the signal source to the portable data carriers. By omitting a response by the individual portable data carriers a data collision is prevented in a very simple fashion. The initialization preferably takes place by means of a unidirectional protocol, in which no communication is provided from the data carrier to the reading device. It is thus rendered possible to subject a plurality of data carriers to the same data stream from the common reading device, since there is no need to wait for and/or process any response data from the data carrier to the reading device.

Preferably the transmission of the data for initialization to a data carrier to be initialized is carried out via contacts formed on the data carrier for connecting a contactless interface, however on which a contactless interface has not been implemented. In this way the advantages of contactless initialization can be used without actually having to provide the data carriers with a corresponding contactless interface; the costs incurred in its implementation are consequently omitted. Alternatively a transmission can be provided to contacts designated for contact-type communication.

Advantageously a pre-determinable period of time is waited for after the transmission of a personalization signal, and then a further personalization signal is transmitted. In particular the period of time is chosen to be at least as long as a processing time expected for the processing of the personalization signal by the portable data carriers. Even without response by the portable data carriers to the signal source it can be reliably avoided in this way that a personalization signal is transmitted to a portable data carrier which is not yet ready to receive. At the same time, a high output remains ensured.

In an advantageous embodiment of the inventive method the portable data carriers check the personalization data determined on the basis of the transmitted personalization signal and/or a memory content generated in the integrated circuit within the framework of the personalization. The checking result can be respectively stored in the data carriers and/or output by the data carriers. It is advantageous therein to make the further processing of the portable data carriers dependent on the respective checking result. The checking result can for example be output to a test device which evaluates the checking result in particular by comparing it to a reference value. In this way errors in the personalization can be detected at an early stage and suitable counter measures can be taken.

In a variant of the method which is used in the personalization of contactless portable data carriers, the personalization signal is transmitted in a contactless fashion. For this purpose it can be provided that several portable data carriers are arranged within a field generated by the personalization device. In particular an alternating magnetic field can be generated by the personalization device. A particularly compact structure can be achieved by arranging the portable data carriers in the form of a stack. In this way the generated field can be used optimally. To ensure a reliable data transmission the field strength can be adjusted to the arrangement of the portable data carriers. In this way it can also be prevented that unnecessarily high field strengths are generated.

For checking the stored personalization-data the portable data carriers can be subjected to an unmodulated field, since for this purpose merely an energy supply to the portable data carriers is necessary, but not a transmission of personalization data.

In a further variant of the method electrically conductive connections are established between the signal source and the portable data carriers for transmitting the personalization signal. This variant of the method can be used in the personalization of contact-type portable data carriers. In particular several portable data carriers are connected to the signal source in parallel. In an advantageous embodiment of the further variant of the method the personalization signal is amplified during the transmission from the signal source to the portable data carriers. Thereby undesirable feedbacks on the personalization signal can be prevented, which can for example be caused by defect portable data carriers.

According to a preferred embodiment of the invention the initialization data are received by adapter elements, each of which can take up at least one or a plurality of the data carriers. Via the adapter element the data are transmitted to the data carrier. The receipt of data from the reading device by the adapter element as well as the transmission of the data to the data carrier can take place in a contactless or contact-type fashion.

For example a plurality of data carriers communicating in a contactless fashion or such data carriers which are adapted to contactless communication with the reading device by means of suitable adapter elements can be guided through a coil tunnel of the reading device or inserted in a Helmholtz coil for the purpose of transmitting the initialization data. For data carriers accommodated in adapter elements with galvanic contact fields the reading device can have contact bars interacting with the contact fields of the adapter elements in order to transmit the initialization data from the reading device to the data carrier.

The transmission of the initialization data is preferably carried out in the form of data blocks, wherein the sequence of the data blocks to be transmitted can be chosen at will. For a complete initialization it is consequently only required that a data carrier receives all data blocks to be received, independent of their sequence. It is thus rendered possible that the reading device transmits the data blocks to be transmitted in cycles and a data carrier to be initialized can enter the initialization area of the reading device, for example the above-mentioned coil tunnel, at any point of the cycle. As soon as the data carrier has remained in the initialization area for the time of a fall cycle, it has received all data blocks required for initialization. Thus a temporally overlapping initialization of different amounts of data carriers is rendered possible.

Preferably the data or data blocks are transmitted by the reading device in an encrypted state and are decrypted on the data carrier. Thus an initialization is possible under secure conditions.

The correctness of the initialization can be checked internally by the data carrier, preferably by means of checksums and preferably only after the initialization. Any interference with the initialization process is thus ruled out.

The invention furthermore relates to an apparatus for personalizing portable data carriers. The apparatus according to the invention has a signal source for generating a personalization signal and an antenna device connected to the signal source for the contactless transmission of the personalization signal. The inventive apparatus is special in that within the transmission range of the antenna device an accommodation area is provided for accommodating several portable data carriers. The thus configured apparatus serves for personalizing contactless portable data carriers.

The invention furthermore relates to an apparatus for personalizing contact-type portable data carriers. This apparatus has a signal source for generating a personalization signal and is characterized in that several contacting devices for electrically contacting respectively at least one portable data carrier are connected to the signal source.

Preferably the contacting devices are respectively connected to the signal source via an intermediate amplifier. It can furthermore be provided that to the contacting devices respectively one testing device is connected, which evaluates a value output by the contacted portable data carrier. In this manner is it possible to evaluate the output values without a data transmission from the portable data carriers to the signal source.

In a preferred embodiment for producing contact-type data carriers the portable data carriers are transported from a first personalization processing station to a second personalization processing station by means of a transport device which electrically contacts the contact area of the portable data carriers by means of a contacting unit at least temporarily. Therein the transport device is temporarily electrically contacted by one of the processing stations, so that an electrically conductive connection is established between this processing station and at least one contacting unit of the transport device. A direct contacting of the portable data carriers by the processing stations is not required. Rather, within the period of time within which the transport device electrically contacts the contact area of the portable data carrier, data are transmitted from one of the processing stations to the electronic circuit of the portable data carrier. In particular the portable data carriers are initialized and/or personalized within the framework of the processing.

The personalization of the portable data carriers can be carried out very efficiently in this manner. Among other things, this results from the fact that the handling of the transport device can be simplified and enables a higher output than the direct handling of individual portable data carriers. In particular the steps of removing the portable data carrier and supplying to a contacting device are omitted.

The contacting unit of the transport device can be brought to an inactive position in which the contacting unit does not contact the contact area of the portable data carrier for a part of the time interval within which the transport device accommodates the portable data carrier. Preferably the contacting unit of the transport device is disposed in the inactive position at least temporarily during the transport. Thereby it can for example be prevented that during this period of time interfering signals are transmitted to the portable data carrier.

The portable data carrier can for example be inserted in a slot of the transport device. It is thus rendered possible to fix the portable data carrier reliably to the transport device and to protect the portable data carrier from undesirable mechanical impacts. Several portable data carriers are respectively accommodated per transport direction. It is thus rendered possible to achieve a very high output of portable data carriers.

The inventive retrofitting method is characterized in that first transport devices for transporting the portable data carriers of a first construction type are replaced by second transport devices for transporting the portable data carriers of a second construction type or are rebuilt into these, and the configuration of external connectors of the transport devices, via which an electric connection to the data carriers accommodated by the transport devices can be established, is maintained therein.

The inventive retrofitting method has the advantage that the production facility can be retrofitted for the processing of portable data carriers of a different construction type at a relatively small effort. Other than exchanging or rebuilding the transport devices no major modifications of the production facility are required.

The inventive transport device is special in that it has at least one contacting unit for electrically contacting the portable data carrier.

The contacting unit is preferably configured in such a fashion that it is movable between an active position, in which it electrically contacts the portable data carrier, and an inactive position, in which it does not electrically contact the portable data carrier. The transport device can have an external connector which is connected to the contacting unit ill an electrically conductive fashion. Advantageously the transport device has several slots for accommodating portable data carriers.

It is an advantage of the inventive production facility that for processing portable data carriers of different construction types different transport devices are provided for transporting the data carriers between different processing stations and for electrically contacting the contact areas of the portable data carriers. Expediently the different transport devices therein have respectively identical external connectors for connecting the transport devices to the processing stations.

In the following the invention will be explained with reference to the embodiments represented in the accompanying drawings. Therein the portable data carriers are respectively configured as chip cards. However, the invention is not limited to chip cards, but relates equally to other portable data carriers. Therein a computing system in which the resources, i.e. the memory resources and/or the computing capacity (computing performance) are limited, e.g. a chip card (smart card, microprocessor chip card) or a token or a chip module for installation in a chip card or in a token, is to be regarded as a portable data carrier in the sense of the invention. The portable data carrier has a body, in which a CPU (a microprocessor) is arranged, and which can have any desired standardized or non-standardized shape, for example the shape of a flat chip card without standard or according to a standard such as e.g. ISO 7810 (e.g. ID-1, ID-00, ID-000) or that of a voluminous token. The portable data carrier can furthermore have one or several interfaces of any desired type for contactless and/or contact-type communication with a reading device or data-processing system (e.g. personal computer, workstation, server).

DETAILED DESCRIPTION OF VARIOUS EMBODIMENTS OF THE DISCLOSURE

Figure 1:
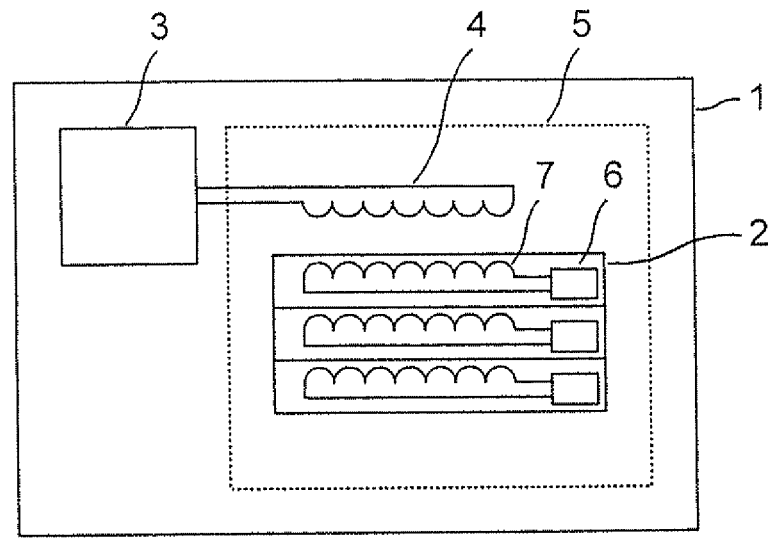
FIG. 1 a representation in principle of a first embodiment of an inventively configured personalization device for personalizing chip cards, FIG. 2 a state diagram to visualize the personalization for one of the chip cards arranged in the accommodation area of the personalization device represented in FIG. 1, FIG. 3 a detail of a state diagram to visualize the variant of the inventive method in which the self test is not carried out directly subsequent to the receipt of the personalization signal, but at a later time, FIG. 4 a detail of a state diagram to visualize the evaluation of the status in formation stored in the chip card, FIG. 5 a representation in principle of a second embodiment of the inventive personalization device for personalizing chip cards, FIG. 6 a representation in principle of a further development of the second embodiment of the inventive personalization device for personalizing chip cards.

FIG. 1 shows a representation in principle of a first embodiment of an inventively configured personalization device 1 for personalizing chip cards 2.

The personalization device 1 encompasses a reading device having a signal source 3 that is connected to a device antenna 4. The device antenna 4 is arranged in an accommodation area 5 for accommodating the chip cards 2 to be personalized. Within the accommodation area 5 several chip cards 2 are stacked. The chip cards 2 are of a contactless design and respectively have an integrated circuit 6 and an antenna 7 connected thereto.

In addition to the shown components the personalization device 1 can also have further components, which are not represented for the sake of clarity.

Within the framework of personalization, personalization data are stored in the integrated circuits 6 of the chip cards 2. The personalization data can be any desired data or programs. The personalization data or data for their generation can be stored in or generated by the signal source 3 or another component of the personalization device 1. Likewise it is possible to transmit the personalization data or data for generating them from an external device to the personalization device 1.

For carrying out the personalization the chip cards 2 are fed into the accommodation area 5 of the personalization device 1. The stack-shaped arrangement of the chip cards 2 shown in FIG. 1 offers the possibility to accommodate many chip cards 2 in an accommodation area 5 with comparatively small dimensions.

The signal source 3 generates a personalization signal which represents the personalization data. The personalization signal is transmitted to the device antenna 4, which is for example embodied in the form of a coil and generates an alternating magnetic field depending on the personalization signal supplied. For example an alternating magnetic field can be produced having the frequency of 13.56 MHz in accordance with ISO/IEC 14443. The field strength of the field generated by the device antenna 4 is chosen in such a fashion that a reception of the personalization signal is possible for each of the stacked chip cards 2. Herein it can be provided that the maximum field strength specified by the standard ISO/IEC 14443-2 $H_{max}$=7.5 A/m is exceeded.

The personalization signal is simultaneously transmitted to all chip cards 2 within the accommodation area 5 of the personalization device 1, that is every chip card 2 receives the same personalization signal. The personalization signal is transmitted unidirectionally from the signal source 3 to the chip cards 2. A signal transmission in reverse direction from the chip cards 2 to the signal source 3 is not provided. It is thus prevented that collisions occur between signals emitted by different chip cards 2. Details of the personalization procedure are described with reference to FIG. 2.

Figure 2:
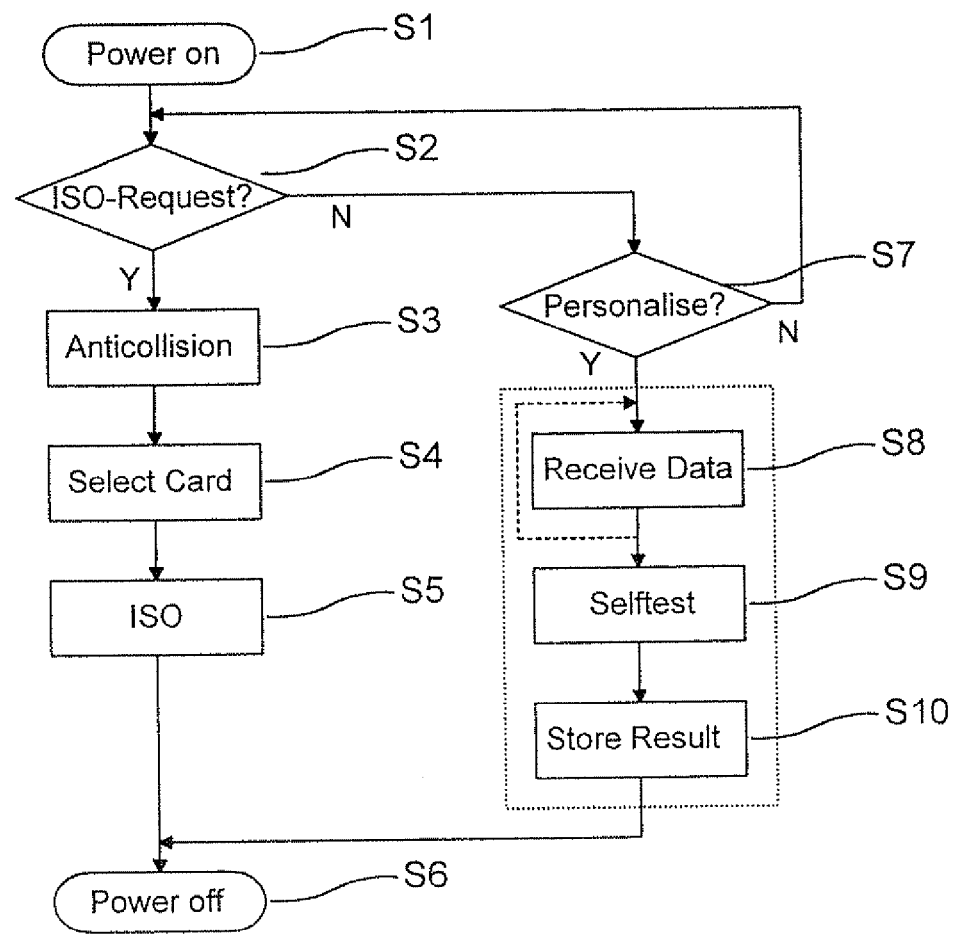

FIG. 2 shows a state diagram to visualize the personalization for one of the chip cards 2 arranged in the accommodation area 5 of the personalization device 1 represented in FIG. 1.

The passage of the state diagram starts with a step S1, in which the chip card 2 is put into operation. The putting into operation is carried out by generating a field in the area of the chip card 2 with a field strength that is sufficient to supply the chip card 2 with energy. The field induces a voltage in the antenna 7 of the chip card 2, from which voltage a supply voltage for the integrated circuit 6 is yielded.

The step S1 is followed by a step S2, in which it is checked whether a data transmission is to be carried out in accordance with the ISO standard. This checking can consist in that a first command received by the chip card 2 is evaluated. If the received first command is a standardized command, for example in accordance with the standard ISO/IEC 14443-3, it is assumed that a data transmission is to be carried out in accordance with ISO and subsequently a step S3 is carried out.

In step S3 an anti-collision algorithm that is known per se is run. The step S3 is followed by a step S4, in which the chip card 2 is selected for data transmission. After step S4 a step S5 is carried out, in which a data transmission takes place in accordance with the ISO protocol. The step S5 is followed by a step S6, in which the chip card 2 is put out of operation. This can be done by switching off the field or by removing the chip card 2 from the field. With step S6 the passage of the state diagram is finished.

The steps S3, S4 and S5 represent the usual bidirectional data transmission in contactless chip cards 2 in accordance with the ISO standard. The chip cards 2 intended for the inventive personalization method are as a rule configured in such a fashion that they can process a data transmission according to the ISO standard. However, within the framework of the inventive personalization method no such data transmission is carried out, but the unidirectional transmission of the personalization signal from the signal source 3 to several chip cards 2, which is described in detail below.

The transmission of the personalization signal is carried out provided that it is determined in step S2 that no data transmission is to be carried out in accordance with the ISO standard. This can be recognized in that the first command analyzed in step 2 differs from a standardized command. In this case step S2 is followed by a step S7, in which it is checked whether a personalization of the chip card 2 is to be carried out. This check can encompass an analysis of the first command. If no personalization is to be carried out, step S2 is carried out again. Otherwise the chip card 2 switches to a personalization mode that starts with a step S8 and is represented in FIG. 2 by a dashed frame.

The signal source 3, which sends the first command simultaneously to all chip cards 2 in the accommodation area 5 of the personalization device 1, does not expect a response to the first command from the chip cards 2, but merely waits for a presettable time. The waiting time is dimensioned in such a fashion that the chip cards 2 have sufficient time to run through the checks of the steps S2 and S7, to switch to the personalization mode and to be ready to receive again.

In the step S8 the chip card 2 receives the personalization signal, with which personalization data are transmitted, from the signal source 3. As indicated by a dashed line in FIG. 2, the personalization data can also be transmitted by repeatedly carrying out the step S8, that is several personalization signals can be transmitted one after another to the chip card 2. The personalization signal is sent by the signal source 3 respectively simultaneously to all chip cards 2 in the accommodation area 5 of the personalization device 1. Therein the signal source 3 does not expect any response from the chip cards 2 and waits for a preset time after sending the personalization signal. The waiting time is dimensioned in such a fashion that the chip cards 2 can check the personalization data transmitted with the personalization signal and store them in a non-volatile memory, for example an EEPROM. The transmitted personalization data are either written directly into the memory or serve as a basis for generating desired memory content.

In order to enable the checking of the transmitted personalization data, the personalization data can be secured by a checksum. The check is preferably carried out directly after receipt of the personalization signal in step S8. In addition there is the possibility to carry out a consistence check of the memory content generated within the framework of the personalization in the integrated circuit 6 of the chip card 2 in a step S9 following the step S8. For this purpose the chip card 2 carries out a self test in the step S9 and thereby determines whether there are any discrepancies. The test result is stored in the chip card 2 in a step S10 following the step S9.

In a variant of the inventive method the self test is carried out at a later time. This will be explained in detail with reference to FIGS. 3 and 4.

Subsequent to step S10, which represents the last step of the personalization, step S6 is carried out, in which the chip card 2 is put out of operation. After this the passage of the state diagram is finished.

Figure 3:
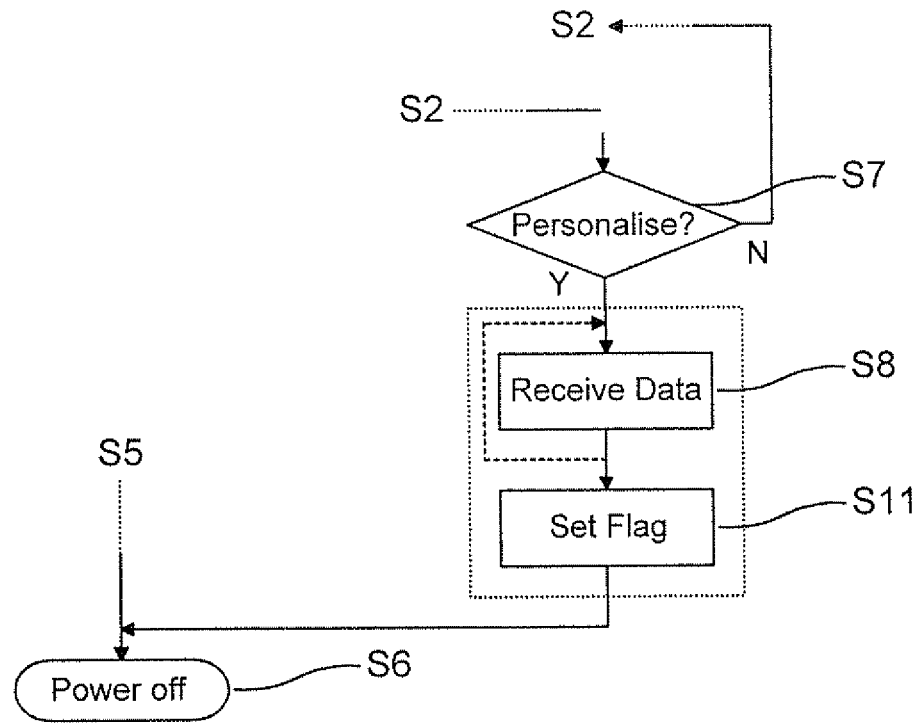

FIG. 3 shows a detail of a state diagram to visualize the variant of the inventive method in which the self test is not carried out directly subsequent to the receipt of the personalization signal, but at a later time. The detail of the state diagram not shown in FIG. 3 is identical to the corresponding detail of the state diagram of FIG. 2.

Figure 4:
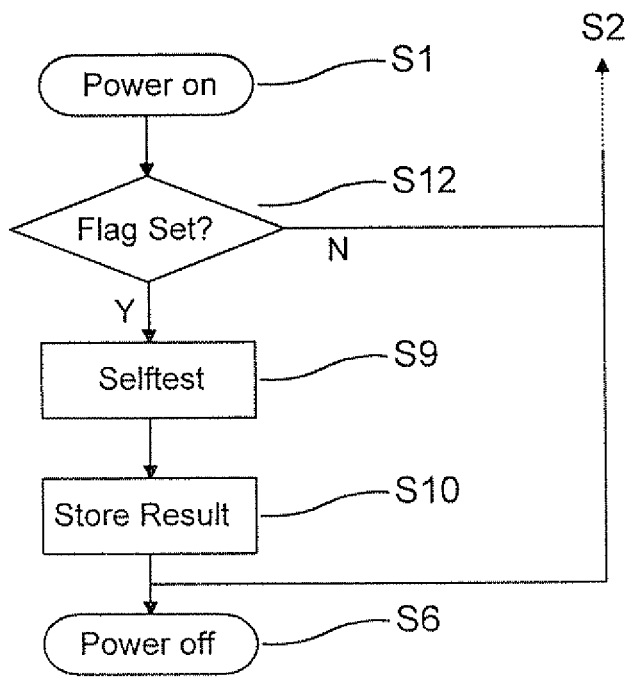

In the variant shown in FIG. 3 a step S11 is carried out instead of the step S9 following the step S8, in which the chip card 2 receives the personalization data. In the step S11 status information is stored in the chip card 2. The status information states that a self test is to be carried out. The evaluation of the status information takes place upon the next putting into operation of the chip card 2. This is shown in FIG. 4. The step S11 is followed by step S6, in which the chip card 2 is put out of operation.

In a not shown variant the step S11 is carried out prior to the step S8. An abortion of the procedure in step S8 inevitably leads to an error message in S9.

FIG. 4 shows a detail of a state diagram to visualize the evaluation of the status information stored in the chip card 2. The not shown detail of the state diagram again corresponds to FIG. 2.

In contrast to FIG. 2 in the state diagram of FIG. 4 subsequent to the putting into operation of the chip card 2 in step S1 a step S12 is carried out first. In the step S12 it is checked whether status information is stored in the memory of the chip card 2. If in step 312 no status information is detected, subsequent to step S12 the state diagram shown in FIG. 2, which can also be varied in accordance with FIG. 3, is run through starting with step S2.

However, if status information is detected in step S12, the step S9 is carried out next. As already explained with reference to FIG. 2, in step S9 the chip card 2 carries out the self test. In the step S10 following the step S9 the test result is stored in the chip card 2. Subsequently the chip card 2 is put out of operation in step S6.

For the above-described execution of the steps S12, S9 and S10 it is not necessary that the signal source 3 has a data connection to the chip card 2. It is merely required that the chip card 2 is supplied with the energy needed for operation. The energy supply can for example be provided by an unmodulated alternating magnetic field into which the chip card 2 is placed.

The reading out of the test result stored in the chip card 2 in the step S10 takes place at a later time, for example after the singling of the chip cards 2. Since the data volume of the test result is very small, the reading out can be carried out without any substantial loss of time within the framework of an individual communication with the chip card 2, for example before individual data are written on the chip card 2. In particular the usual bidirectional communication mode in accordance with the standard ISO/IEC 14443-3 can be used for the reading out. In this context it can be provided that the chip card 2 is not put out of operation after the step S10 has been executed, but is switched to a wait state. This can be achieved by having the step S10 followed by the step S2 of the state diagram represented in FIG. 2.

In the case that by reading out the test result it is detected that an error occurred in the personalization, the chip card 2 is subjected to a special treatment. This can for example consist in that the error which occurred in the personalization is corrected if possible, or in that the chip card 2 is discarded as unfit for use.

Figure 5:
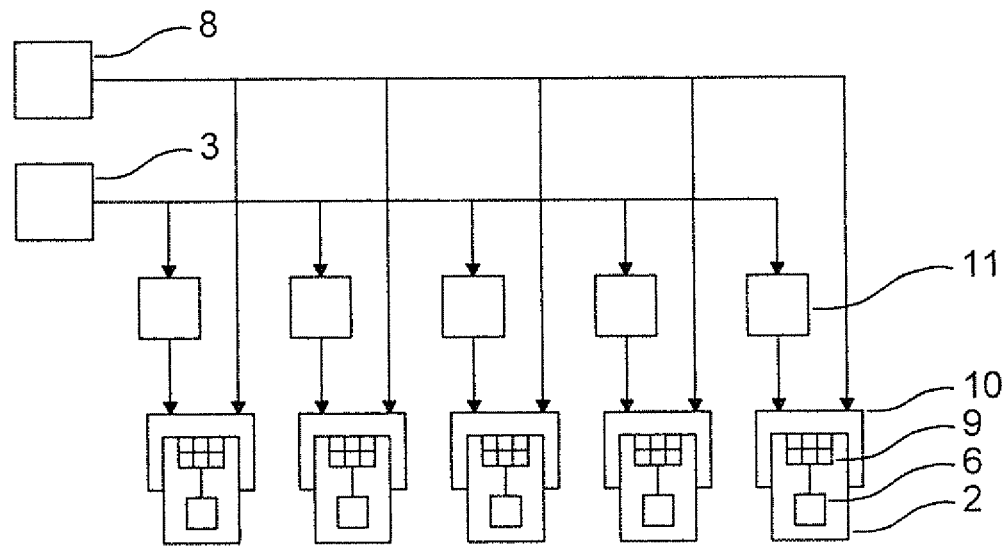

FIG. 5 shows a representation in principle of a second embodiment of the inventive personalization device 1 for personalizing chip cards 2. The embodiment of the personalization device 1 shown in FIG. 5 is intended for the personalization of contact-type chip cards 2 and has the signal source 3 and a supply device 8. The chip cards 2 each have a contact field 9 which is connected to the integrated circuit 6 in an electrically conductive fashion.

The signal source 3 provides the same personalization signal for all chip cards 2. The supply device 8 supplies the chip cards 2 with a supply voltage and a clock signal, which are required for operating the chip cards 2. As can be gathered from FIG. 5 a plurality of chip cards 2 is connected to the signal source 3 and to the supply device 8. For this purpose the contact fields 9 of the chip cards 2 are each electrically contacted by a contacting device 10. The contacting devices 10 merely serve for producing a galvanic connection and do not require electronics of their own. The contacting devices 10 are respectively directly connected to the supply device 8 and, via respectively one intermediate amplifier 11, to the signal source 3. By using the intermediate amplifiers 11 any undesirable feedbacks by defect chip cards 2 interfering with the personalization signal can be avoided. However, the intermediate amplifiers 1 are not obligatory and can be omitted if the signal source 3 is sufficiently powerful. Likewise it is possible to integrate the intermediate amplifiers 11 in the contact devices 10.

In the second embodiment of the personalization device 1 the personalization of the chip cards 2 can be carried out analogously to the first embodiment. This means that the signal source 3 simultaneously transmits the same personalization signal to all chip cards 2.

The chip cards 2 emit an answer-to-reset signal immediately after being put into operation by the application of the supply voltage and the clock signal, and are then ready to receive data. The personalization of the chip cards 2 takes place in accordance with the steps S8, S9 and S10 of the state diagram of FIG. 2. Like in the personalization of the contactless chip cards 2 also in the case of the contact-type chip cards 2 only one single signal source 3 is required, independent of the number of the chip cards 2 to be personalized simultaneously. During the personalization no data transmission from the chip cards 2 to the signal source 3 takes place. The maximum number of the chip cards 2 which can be personalized simultaneously using the same signal source 3 consequently depends only on the power of the supply device 8 as well as the number of contacting devices 10 and intermediate amplifiers 11. If no intermediate amplifiers 11 are used, the power of the signal source 3 represents a further limiting factor.

Figure 6:
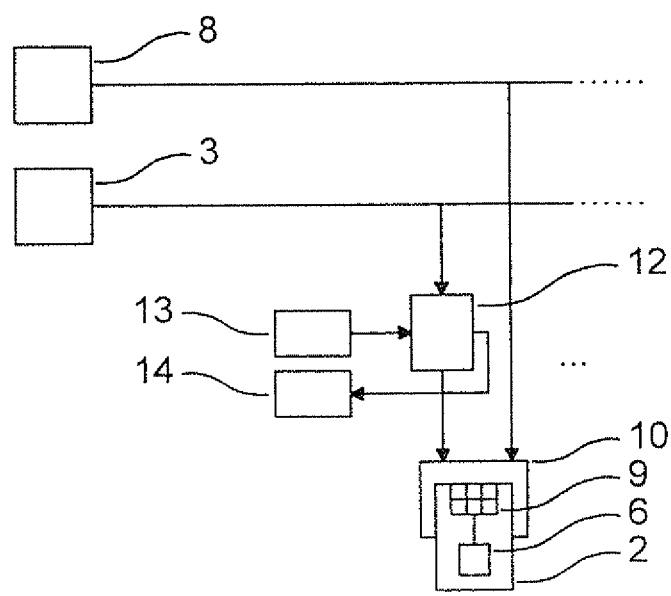

FIG. 6 shows a representation in principle of a further development of the second embodiment of the inventive personalization device 1 for personalizing chip cards 2. The further development is characterized in that for each chip card 2 a comparator 12 is provided, which is connected to the data line from the signal source 3 to the chip card 2. As shown in FIG. 6 the comparators 12 can replace the intermediate amplifiers 11. Alternatively there is the possibility to integrate the intermediate amplifiers 11 in the comparators 12 or to connect them upstream of the comparators 12 on the side of the signal source 3. The comparators 12 check whether the test result detected in step S9 by the respectively connected chip card 2 corresponds to a reference value. For this purpose the comparators 12 can have a very simple design, wherein a small number of logic gates can be sufficient for its realization.

The reference values required for comparison are stored in the comparators 12 prior to or after the transmission of the personalization signal to the chip cards 2. The reference values can be stored in a reference value memory 13 connected to the comparators 12. Furthermore in the comparators 12 the test values determined by the chip cards 2 are stored, which are transmitted to the comparators 12 by the chip cards 2 for this purpose. The comparators 12 compare the test results with the reference values and provide the thus determined comparison results for the further processing of the chip cards 2. For this purpose the comparators 12 can be connected to a display device 14, to which the comparison results are transmitted. In the case that one of the comparison results points to all error in the personalization, the corresponding chip card 2 is subjected to a special treatment.

In the further development of the second embodiment shown in FIG. 6 the chip cards 2 each send a response. However, this response does not represent a communication with the signal source 3, since it is only transmitted to the comparator 12 connected to the respective chip card 2 and does not reach the signal source 3. Accordingly, no problems are incurred through different responses by the chip cards 2 transmitted at the same time, since they are transmitted on different channels and do not influence each other.

In the following embodiments of the invention are shown in greater detail, which are based on the use of adapter elements 100. The FIGS. 7 to 9 concern a first embodiment.

Figure 7:
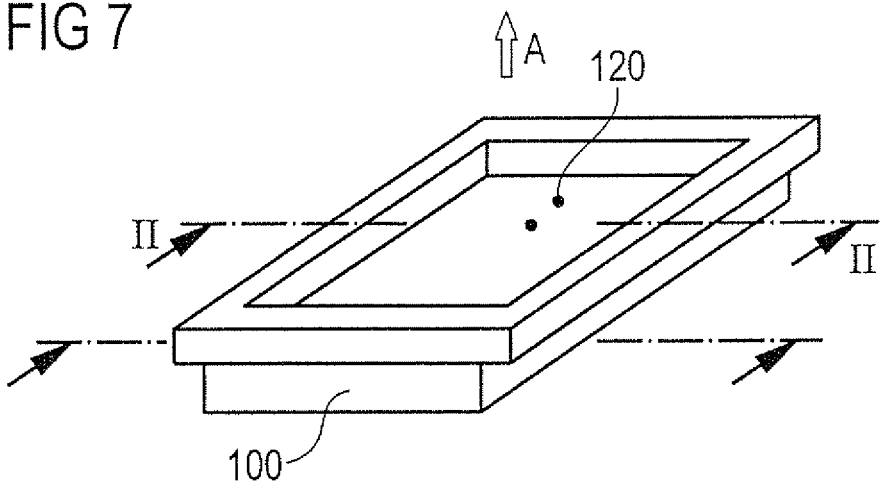
FIG. 7 a perspective view of an adapter element for a data carrier for carrying out an inventive method according to a first embodiment.
Figure 8:
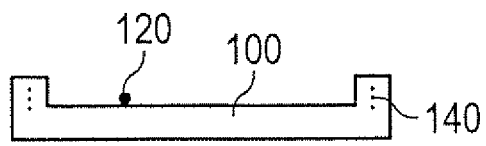
FIG. 8 a cross section of the adapter element of FIG. 7 along the line II-II.

FIG. 7 shows a perspective view of an adapter element 100 for accommodating a data carrier. The data carrier to be accommodated fundamentally works in contact-type fashion and correspondingly has a contacting interface. In particular for initialization it has further contacts for connecting a contactless interface in the form of a coil; these will be referred to as antenna contacts in the following. The adapter element 100 is adapted to receiving in a contactless fashion a personalization signal from a reading device with personalization data for personalizing the data carrier 2. It is provided with a coil 140. FIG. 8 shows a cross section of the coil wires 140. Via the coil 140 also energy can be supplied to the adapter element 100. The adapter element 100 is furthermore equipped with contacts 120 of a flexible, conductive material, which interact with the antenna contacts of the accommodated data carrier, typically the contacts C4 and C8 in the case of a data carrier in accordance with ISO 7816-2). Via the contacts 120 and the antenna contacts of the accommodated data carrier the adapter element 100 transmits the RF field received via the coil 140 to the data carrier in the form of current and voltage.

Figure 9:
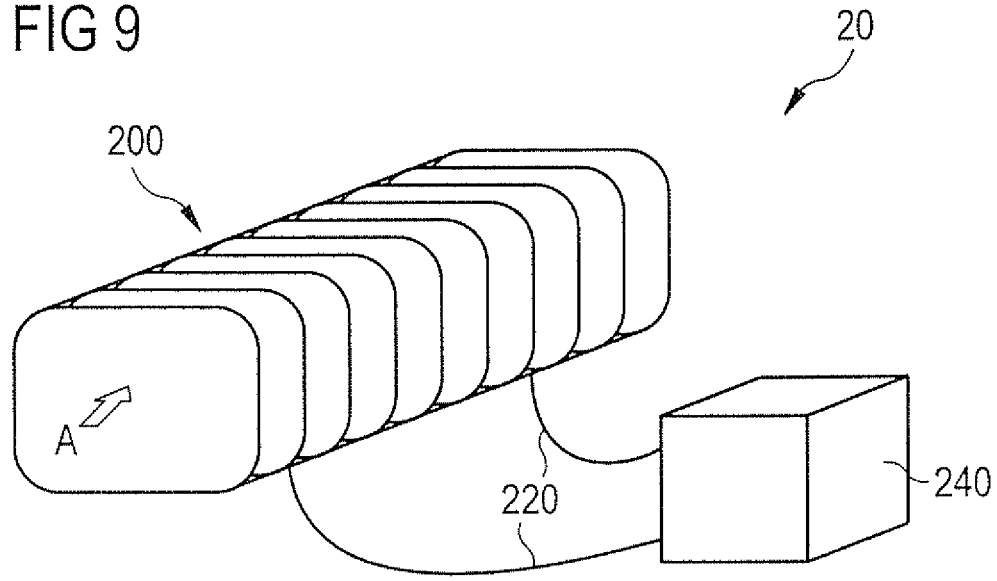
FIG. 9 a perspective view of a coil tunnel for a reading device for carrying out the inventive method according to the first embodiment.

FIG. 9 shows a coil tunnel 200 of a corresponding reading device 20, through which data carriers 2 to be personalized, which are respectively accommodated in an adapter element 100, are guided in the direction of the arrow A for the purpose of their initialization. The transmission of the data for initialization from the reading device 20 via the adapter elements 100 to the data carriers 2 takes place in a contactless fashion via an elongated antenna coil 200, whose connectors are marked with 220 and which winds around the tunnel 200, in order to generate a uniform electromagnetic field, wherein in the tunnel 200 a magnetic field is formed which extends along the longitudinal axis of the tunnel. The data carriers are preferably oriented in such a manner during transport through the tunnel 200 that the plane of the coils 140 of the adapter elements 100 is perpendicular to the magnetic field present in the tunnel 200; correspondingly the adapter elements 100 preferably stand upright during transport through the tunnel 200. Thus many data carriers can be guided simultaneously through the tunnel coil 200 and can be initialized correspondingly simultaneously or at least in a temporally overlapping fashion. Of course such data carriers which, due to their design, can already communicate in a contactless fashion with the reading device via the coil tunnel, that is which have ala antenna coil themselves, can be guided through the coil tunnel 200 for the purpose of their initialization without the above-mentioned adapter elements 100.

The simultaneous or at least temporally overlapping personalization, in particular the initialization of the plurality of data carriers in this embodiment and also in all further embodiments explained below, takes place by means of a unidirectional protocol in which no communication is provided from the data carrier to the reading device. Thereby the plurality of data carriers in the coil tunnel 200 can be subjected to the same data stream from the reading device 20. In FIG. 9 the reference numeral 240 designates the data processing device of the reading device 20 required for this purpose. The reading device 20 does not have to wait for and/or process any response data from the data carriers. The unidirectional protocol is deactivated on the data carrier after the conclusion of the initialization, so that in the subsequent use of the data carrier the usual communication protocol can be used again, which also allows for response data by the data carrier to commands received. Different variants of the unidirectional protocol are possible in regard of activation and storing. On the one hand the protocol can be stored in the ROM of the data carrier and be activated implicitly, which does not require a prior initialization of the data carrier with the conventional communication protocol that is customary later on in normal use. On the other hand an explicit application and activation of the protocol is possible, for example during the hardware check of the data carrier, whereby some memory capacity can be saved in the ROM.

The initialization data are transmitted by the reading device to the data carriers in the form of data blocks. Advantageously in the unidirectional protocol the size of the transmitted data blocks should be adapted to the writing characteristics and transport capacities of the hardware involved. Therein the protocol can support a transmission of the data blocks for initialization in any desired sequence, whereby a temporally overlapping initialization of different amounts of data carriers is rendered possible. Preferably the data for initialization are transmitted by the reading device to the data carriers in an encrypted state and are decrypted only on the data carrier. The correctness of the initialization can be checked by the data carrier internally after the conclusion of the initialization, for example by means of checksums.

Figure 10:
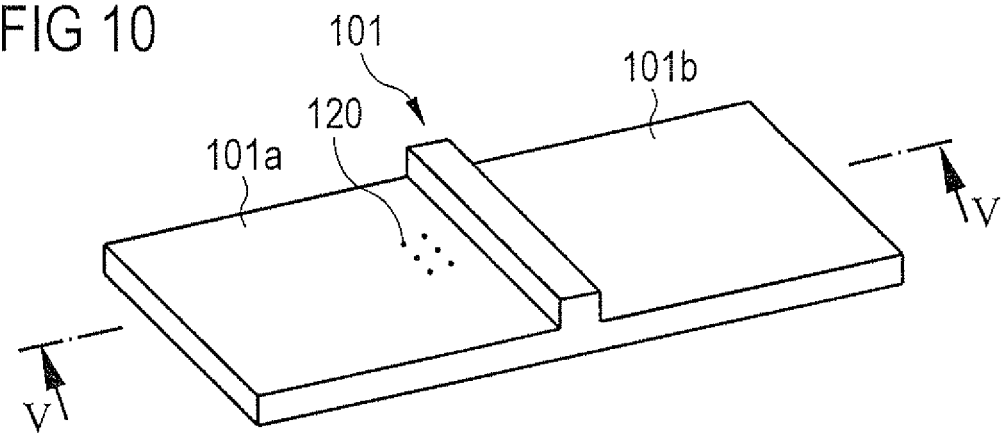
FIG. 10 a perspective view of an adapter element for a data carrier for carrying out an inventive method according to a second embodiment.
Figure 11:
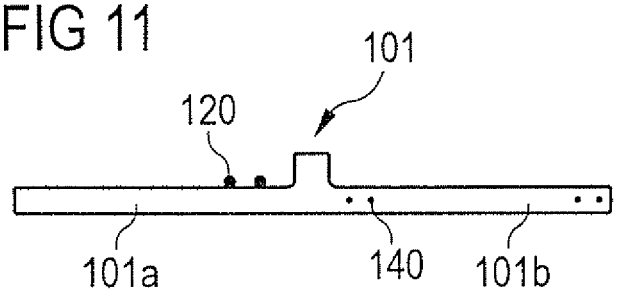
FIG. 11 a cross section of the adapter element of FIG. 10 along the line V-V.
Figure 12:
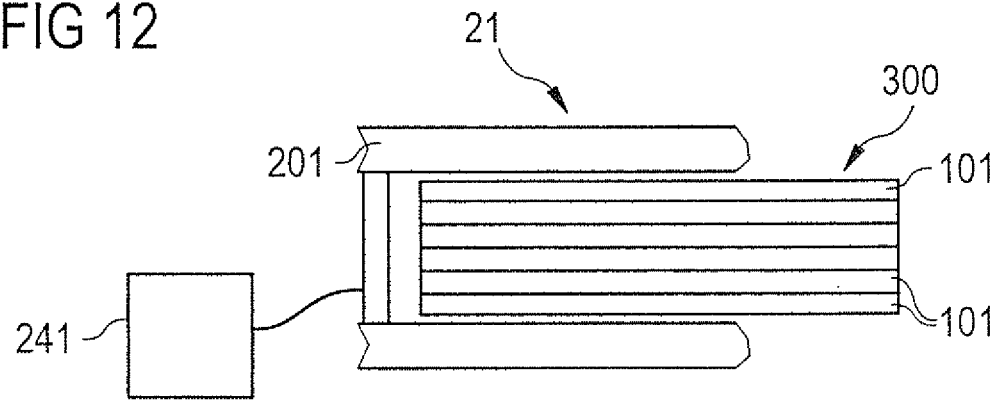
FIG. 12 a lateral view of a Helmholtz coil for a reading device for carrying out the inventive method according to the second embodiment.

The FIGS. 10 to 12 concern a second embodiment of the invention. FIG. 10 shows a perspective view of an adapter element 101 for accommodating a data carrier to be initialized, which in turn has contacts provided for connecting a contactless interface. Like in the first embodiment the transmission of data for initialization takes place in a contactless fashion from a reading device to the adapter element 101, which transmits the supplied RF field to the antenna contacts of the data carrier in the form of current and voltage.

For this purpose the adapter element 101 comprises two halves 101a and 101b. The one half 101b comprises a coil 140 for contactless communication with the reading device. In FIG. 11 the coil wires 140 are represented in a sectional view. The other half 101a of the adapter element 101 has contacts 120 of a flexible, conductive material, which interact with the antenna contacts of the accommodated data carrier, i.e. for instance with the contacts C4 and C8 in the case of a data carrier in accordance with ISO 7816-2.

FIG. 12 shows a lateral view of a Helmholtz coil 201 of a reading device 21 (with data processing device 241) for the simultaneous initialization of a plurality of data carriers, which are respectively accommodated in such adapter elements 101 and are supplied to the Helmholtz coil in the form of a stack 300. The Helmholtz coil 201 generates a uniform field suitable for the simultaneous initialization of all data carriers, which is coupled to the adapter elements 101 via the coils 140. In addition to the initialization data also energy can be transmitted to the data carriers via the adapter elements in which they are accommodated. Such data carriers which, due to their design, can already communicate in a contactless fashion with the reading device 201 via the Helmholtz coil, that is which have an antenna coil themselves, can be inserted in the Helmholtz coil 201 for the purpose of initialization without any special adapter elements.

The first embodiment of the invention allows for the simultaneous initialization of e.g. 500 data carriers without any problem, the second embodiment allowing for the simultaneous initialization of e.g. 50 data carriers.

Figure 13:
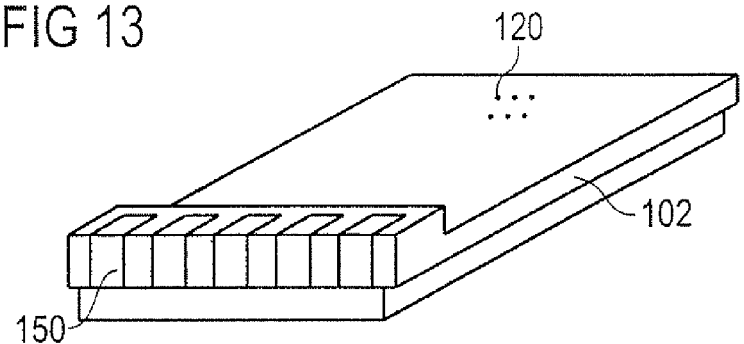
FIG. 13 a perspective view of an adapter element for a data carrier for carrying out an inventive method according to a third embodiment.
Figure 14:
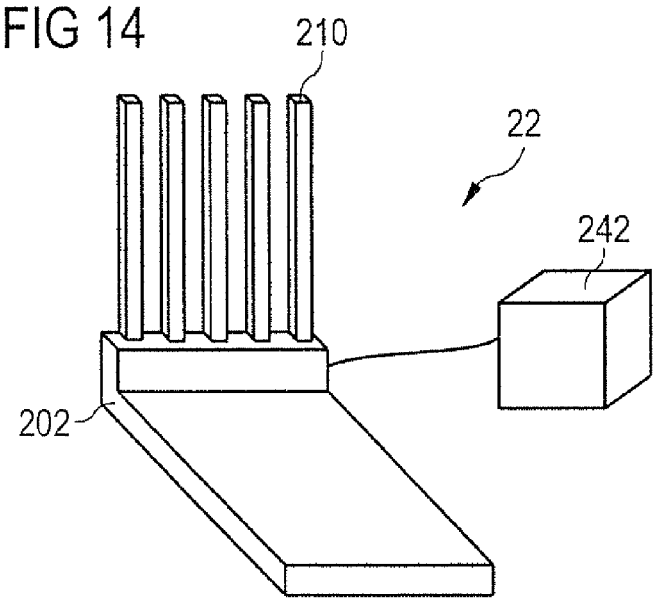
FIG. 14 a perspective view of a connecting device of a reading device for carrying out the inventive method according to the third embodiment.
Figure 15:
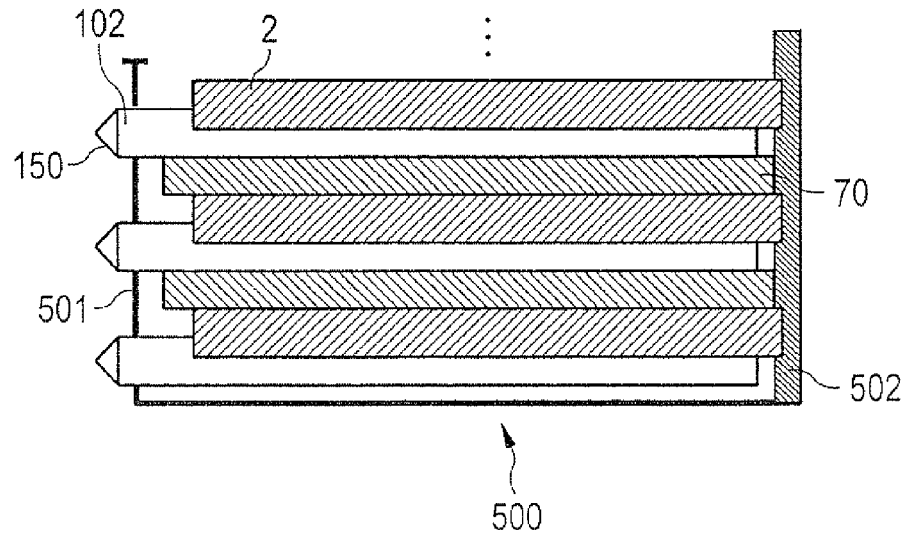
FIG. 15 a lateral view of a container for stacking the adapter elements of FIG. 13, FIG. 16 a schematic representation of the principle of a variant of the third embodiment of the invention, FIG. 17 the inside structure of an embodiment of the transport magazine in a schematic representation, FIG. 18 the back side of an embodiment of the transport magazine in a schematic representation, FIGS. 19, 20, 21 different snapshots of a detail from FIG. 17 to visualize the contacting of the chip cards in the transport magazine, FIG. 22 an embodiment of a production facility for processing chip cards in a block representation, FIG. 23 the inside structure of an embodiment of the transport magazine and of a processing station shortly prior to an electronic processing of the chip cards within the transport magazine in a schematic representation, FIG. 24 the inside structure of the transport magazine and the processing station of FIG. 23 during the electronic processing of the chip cards within the transport magazine in a schematic representation and FIG. 25 an embodiment of a removal device for the chip cards in a schematic representation.

The FIGS. 13 to 15 concern a third embodiment of the invention. FIG. 13 shows a perspective view of an adapter element 102, which is adapted to accommodating a data carrier intended for contact-type communication, for example a data carrier according to ISO 7816-2. For this purpose the adapter element 102 has contacts 120 of a flexible, conductive material to interact in a contact-type fashion for communication with the contacts C1, C2, C3, C5 and C7 (in accordance with ISO 7816-2) of an accommodated data carrier. Furthermore the adapter element 102 is adapted to receiving data for initialization in a contact-type fashion from a connecting device 202 of a reading device 22, which is shown in a perspective view in FIG. 14. For this purpose the adapter element 102 has contact surfaces 150, which can for example be configured as spring plates. The adapter element 102 with the data carrier accommodated therein is then connected to the connecting device 202 of the reading device 22, whose data-processing device is marked by the reference numeral 242. The connecting device 202 has contact bars 210, which can simultaneously interact with the contact surfaces 150 of a plurality of adapter elements 102 for contact-type communication.

FIG. 15 illustrates in a lateral view a container 500, by means of which a plurality of such adapter elements 102 with data carriers 2 accommodated therein can be fed to the connecting device 202 in the form of a stack. When the adapter elements 102 are inserted in the container 500 a filling layer 70 is arranged respectively between a data carrier 2 and the adjoining adapter element 102. The data carriers 2 abut on a common back wall 502 of the container 500 and are thus oriented uniformly. On the front wall 501 of the container 500 the contact surfaces 150 of the adapter elements 102 protrude from the container 500, in order to interact for communication in a contact-type fashion with the contact bars 210 of the connecting device 202.

The FIGS. 16 to 25 show an alternative embodiment of the third embodiment of the invention.

Figure 16:
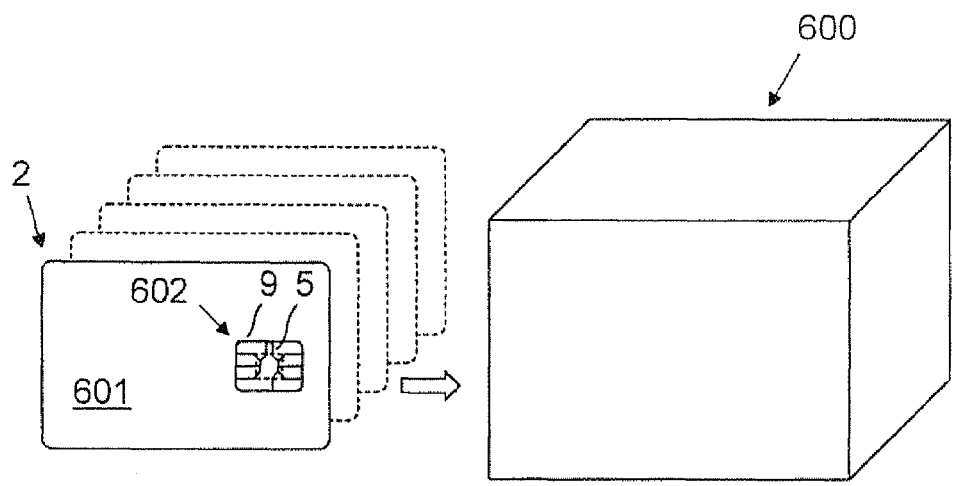

FIG. 16 firstly shows a schematic representation of the principle of the alternative embodiment. It shows several portable data carriers 2 in the form of chip cards operating in a contact-type fashion, as well as a transport magazine 600 for accommodating the chip cards 2. One of the chip cards 2 is indicated with full lines, the other with dashed lines. This is to express that the transport magazine 600 can accommodate at least one chip card 2, however as a rule several chip cards 2.

The chip cards 2 each have a card body 601 in which a chip module 602 is implanted. The card body 601 can for example consist of plastic and can be produced by laminating or injection molding. The chip module 602 has an integrated circuit 6 and a contact field 9 which is connected to the integrated circuit 6 in an electrically conductive fashion. Instead of one single chip module 602 also several chip modules 602 can be provided per chip card 2.

The structure of the transport magazine 600 is not shown in detail in FIG. 16 and is explained in detail with reference to FIG. 17 to 23.

Figure 17:
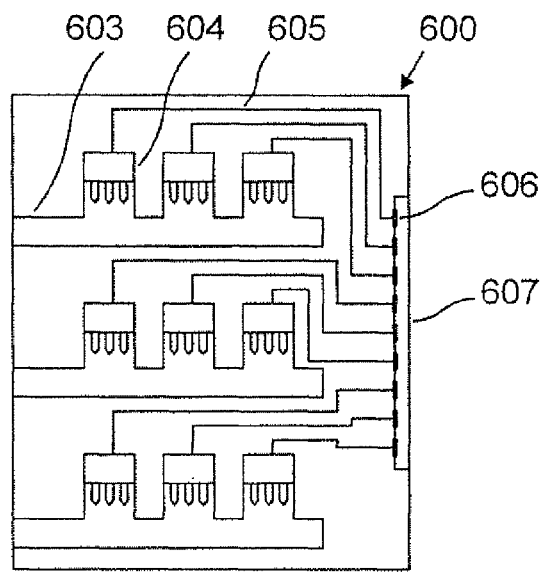

FIG. 17 shows the inside structure of an embodiment of the transport magazine 600 in a schematic representation. In the shown embodiment the transport magazine 600 has several slots 603, each of which can accommodate one chip card 2. Instead of the slots 603 shown in FIG. 17 also a different number of slots 603 can be provided; it is also possible to provide only one slot 603.

Adjoining every slot 603 one or several contacting units 604 are arranged, which are movable transversally to the slot 603. The number of contacting units 604 per slot 603 can also differ from the representation of FIG. 17. The contacting units 604 serve for contacting the contact fields 9 of the chip cards 2 and are connected with contacts 606 via leads 605. The contacts 606 form part of a connecting socket 607 on the back side of the transport magazine 600, which is explained in greater detail with reference to FIG. 18.

Figure 18:
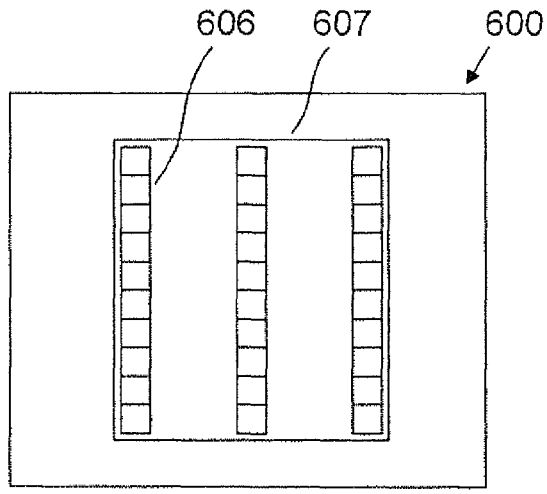

FIG. 18 shows the back side of an embodiment of the transport magazine 600 in a schematic representation. The contacts 606 shown in FIG. 18 are connected with the contacting units 604 and are strung together to form groups, wherein the individual contacts 606 are electrically isolated from each other. The groups can for example be formed in such a manner that one group each is allocated to the contacting units 604 of respectively one slot 603.

Figure 19:
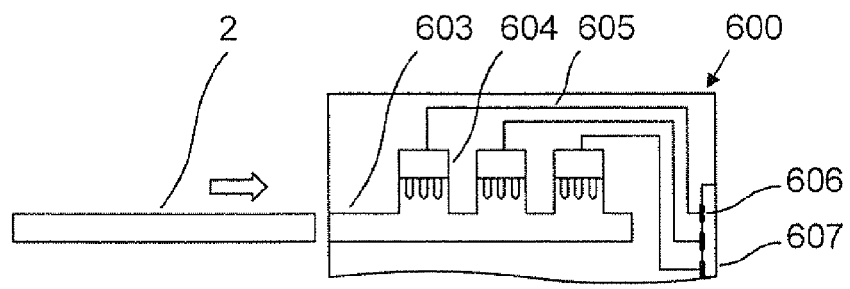
Figure 20:
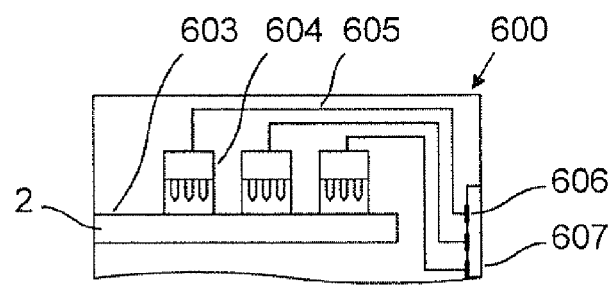
Figure 21:
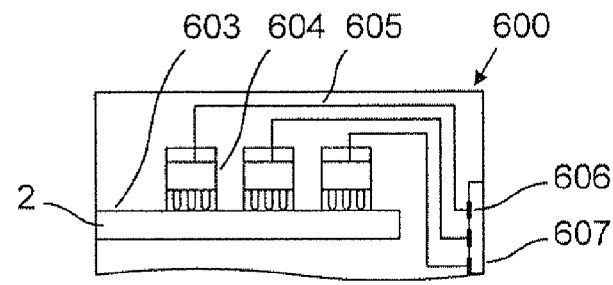

With reference to FIG. 19 to 21 it is explained how the chip cards 2 are contacted and thereby electrically conductive connections are formed between the integrated circuits 6 of the chip cards 2 and the contacts 606 of the transport magazine 600. For the sake of clarity, the snapshots represented in FIG. 19 to 21 each show only one portion of the transport magazine 600 of FIG. 17.

At the time shown in FIG. 19 the chip card 2 is not yet inserted in the represented slot 603 of the transport magazine 600. The contacting units 604 are respectively in their inactive position at a predetermined distance to the slot 603.

At the time shown in FIG. 20 the chip card 2 is fully inserted in the represented slot 603 of the transport magazine 600. Without any change in comparison to FIG. 19 the contacting units 604 are respectively in their inactive position and are thus spaced apart form the chip card 2. Consequently the chip card 2 is not yet contacted by the contacting units 604. The contacting units 604 are then approximated to the chip card 2 until they touch the contact fields 9 of the chip card 2. This is shown in FIG. 21.

In FIG. 21 the contacting units 604 are respectively no longer in their inactive position, but in their operating position. The operating position is characterized in that the contacting units 604 touch the contact field 9 of the chip card 2 and thereby an electrically conductive connection is formed between the integrated circuits 6 of the chip card 2 and the contacts 606 of the transport magazine 600. This is analogously valid for all chip cards 2 inserted in the slots 603 of the transport magazine 600, and also in the case that these chip cards 2 have only one single chip module 602 each and are consequently contacted only by one contacting unit 604.

Figure 22:
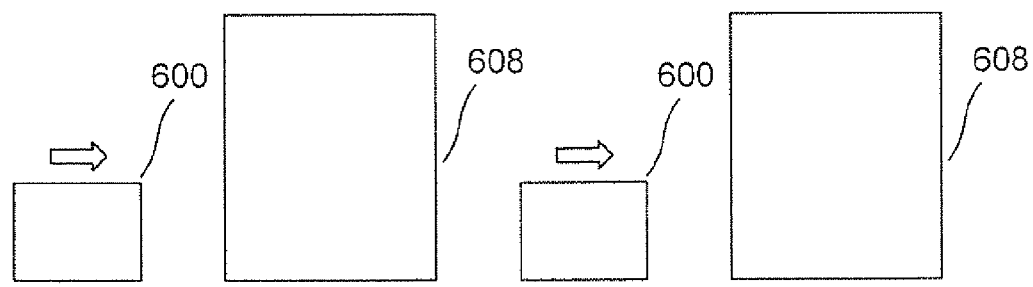

FIG. 22 shows an embodiment of a production facility for personalizing chip cards 2 in a strongly simplified block representation. The production facility has several processing stations 608 for personalizing the chip cards 2. The processing stations 608 can for example be a test station for testing the integrated circuits 6 of the chip cards 2, an initialization or personalization station for writing personalization data into the integrated circuits 6 of the chip cards 2, a laser labeling station for labeling the card bodies 601 of the chip cards 2, etc.

Figure 23:
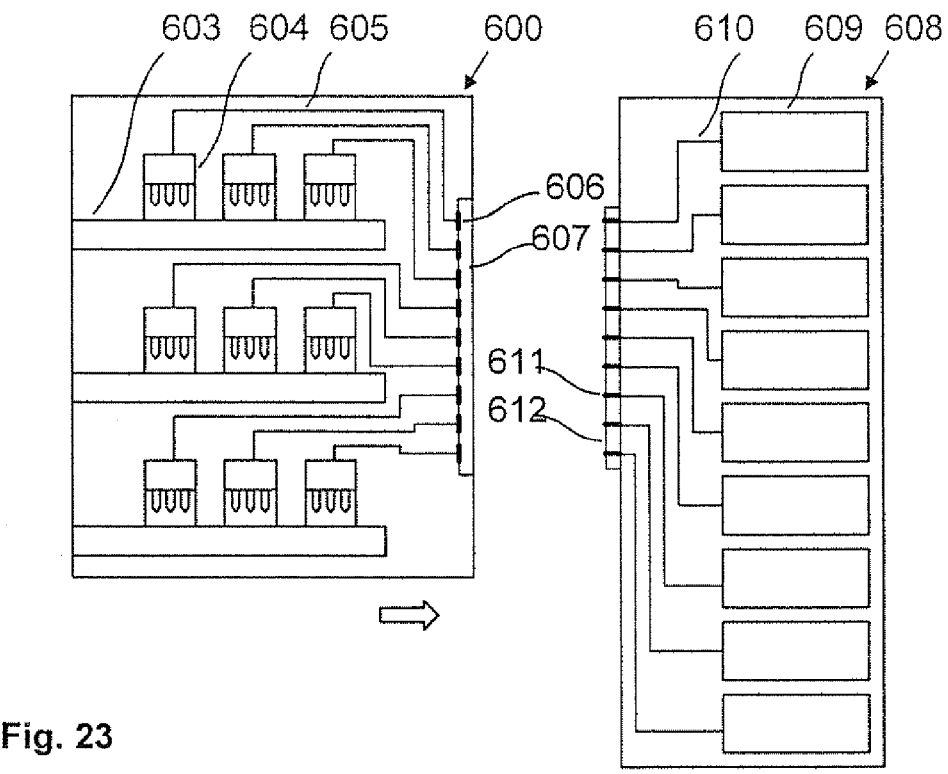
Figure 24:
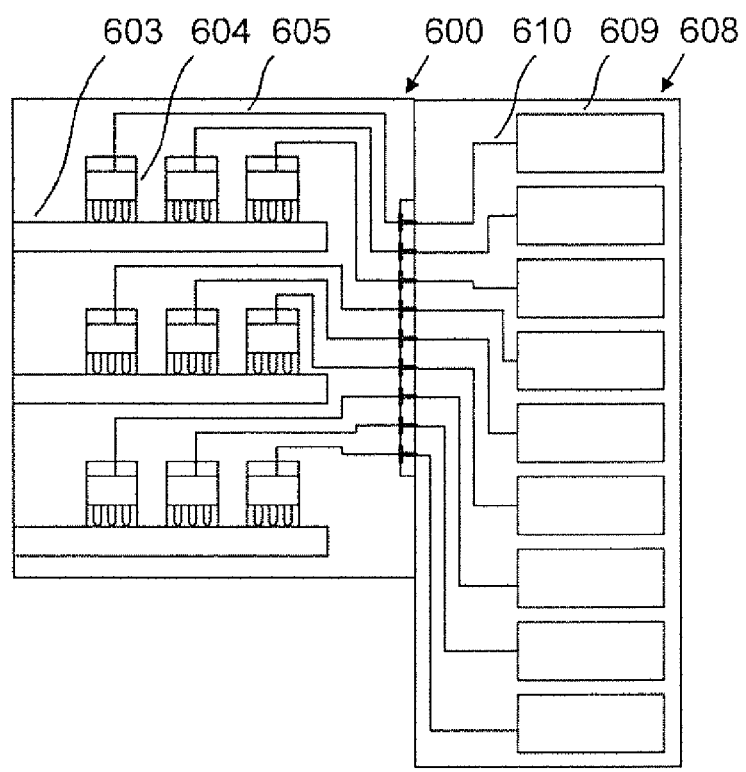
Figure 25:
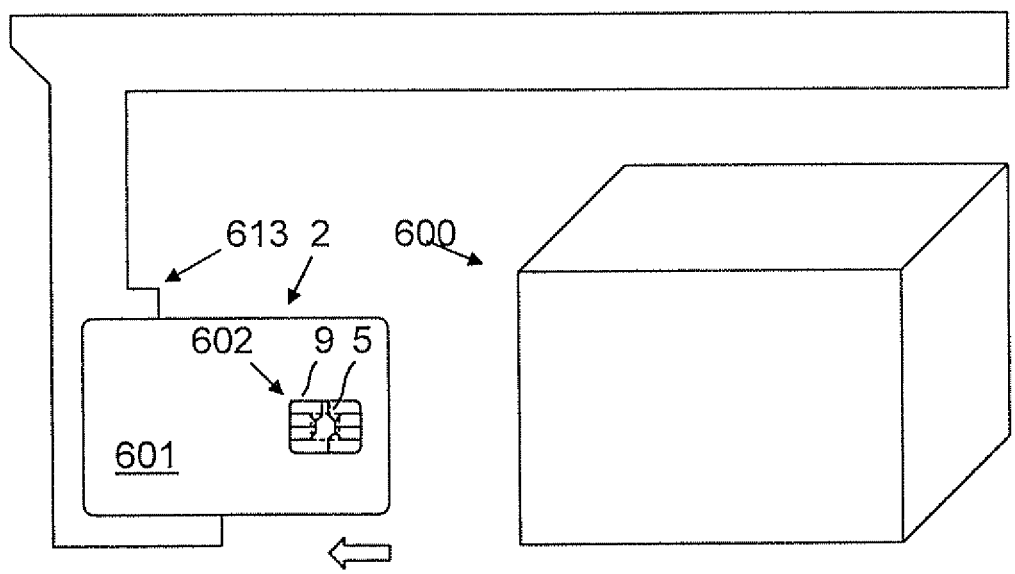

The chip cards 2 are transported in the transport magazines 600 from one processing station 608 to the next. Depending on the type of processing station 608 the chip cards 2 remain in the transport magazines 600 during the processing by the processing station 608, or they are removed from the transport magazines 600 before processing. The processing can take place in the transport magazines 600 in particular if the processing is of an electronic type, i.e. if for the processing only an electric contacting of the integrated circuits 6 of the chip cards 2 is necessary. In contrast, if the surface of the chip cards 2 has to be accessible, as is the case for example in a laser labeling or other optical processing, the chip cards 2 are usually removed from the transport magazines 600. A processing within the transport magazines 600 is shown in FIGS. 23 and 24. A removal of the chip cards 2 from the transport magazines 600 is shown in FIG. 25.

FIG. 23 shows the inside structure of an embodiment of the transport magazine 600 and of a processing station 608 shortly prior to an electronic processing of the chip cards 2 within the transport magazine 600 in a schematic representation. At the same time the chip cards 2 are arranged in the slots 603 of the transport magazine 600, the contacting units 604 of the transport magazine 600 do not touch the contact fields 9 of the chip cards 2. The processing station 608 is an initialization or personalization station with a plurality of card readers 609. The card readers 609 are each connected via leads 610 with contacts 611 of a plug 612. The plug 612 is configured in such a manner that it fits the connecting socket 607 of the transport magazine 600, wherein in addition the arrangement of the contacts 611 within the plug 612 is adjusted to the arrangement of the contacts 606 within the connecting socket 607. This means that upon a further approximation of the transport magazine 600 to the processing station 608 the plug 612 is inserted in the connecting socket 607 in such a fashion that the contacts 611 of the plug 612 are pressed against the contacts 606 of the connecting socket 607. At the same time, for example when the plug 612 is inserted in the connecting socket 607, the contacting units 604 of the transport magazine 600 are approximated to the contact fields 9 of the chip cards 2 until they finally touch them. The state after inserting the plug 612 of the processing station 608 in the connecting socket 607 of the transport magazine 600 is shown in FIG. 24.

FIG. 23 finally shows the inside structure of the transport magazine 600 and of the processing station 608 of FIG. 23 during the electronic processing of the chip cards 2 within the transport magazine 600. The contacts 611 of the plug 612 of the processing station 608 touch the contacts 606 of the connecting socket 607 of the transport magazine 600. Furthermore, the contacting units 604 of the transport magazine 600 touch the contact fields 9 of the chip cards 2. Consequently, on the whole an electrically conductive connection is given between the integrated circuits 6 of the chip cards 2 and the card readers 609 of the processing station 608, which extends over the contact fields 9 of the chip cards 2, the contacting units 604 of the transport magazine 600, the leads 605 between the contacting units 604 and the contacts 606 of the transport magazine 600, the contacts 611 of the processing station 608 and the leads 610 between the contacts 611 and the card readers 609 of the processing station 608. For this reason it is for example possible to carry out an initialization or a personalization of the chip cards 2 without removing the chip cards 2 from the transport magazines 600.

Since the transport of the chip cards 2 through the production facility takes place within the transport magazines 600 and the electrical contact to the processing stations 608 is established via the transport magazines 600, the outer dimensions of the chip cards 2, as well as the position and configuration of the contact fields 6 do not have any influence on the configuration of the production facility, by the exception of the transport magazines 600. With the same production facility therefore chip cards 2 of different formats can be processed. For this purpose merely suitable transport magazines 600 have to be employed. As long as the chip cards 2 are processed exclusively within the transport magazines 600 no modifications of the production facility are necessary. If the chip cards 2 are removed from the transport magazines 600 during the production, modifications are required for differing chip-card formats, however which as a rule can be carried out at a justifiable effort. An example for a removal of the chip cards 2 from the transport magazines 600 is shown in FIG. 25.

FIG. 25 shows a schematic representation of an embodiment of a removal device 613 for chip cards 2. The removal device 613 can for example be configured in the form of a gripper and is always required when the chip cards 2 have to be removed from the transport magazine 600 or have to be inserted in it. This is the case for example if the chip cards 2 are fed to a processing station 608 which carries out an optical processing of the chip cards 2, for example laser labeling. In the case that the production facility is retrofitted to a different chip card format the removal device 613 is to be modified accordingly.

The invention claimed is:

1. A method for parallel personalization of a plurality of portable data carriers, each having an integrated circuit for at least one of storing or processing information and a nonvolatile memory, comprising the steps:
    transmitting a personalization signal with personalization data to each of the plurality of portable data carriers from a reading device, and
    storing the transmitted personalization data in the nonvolatile memory of the integrated circuit of each of the portable data carriers,
    wherein the same personalization signal is transmitted simultaneously or at least in temporally overlapping fashion by an antenna device of the reading device in a contactless fashion to the portable data carriers,
    wherein the personalization signal is received in a contactless fashion by at least one adapter element, the at least one adapter element accommodates one of the portable data carriers, and the personalization signal is transmitted to the accommodated portable data carrier by the at least one adapter element via contacts on the portable data carrier provided for connecting a contactless interface,
    wherein the plurality of the data carriers is guided through a coil tunnel of the reading device where the personalization data from the reading device is transmitted to the portable data carriers.

2. The method according to claim 1, wherein the personalization signal is transmitted within the framework of a unidirectional signal transmission, in which no communication from the portable data carriers to the reading device is provided.

3. The method according to claim 1, wherein the data are received by the portable data carriers in a contactless fashion.

4. The method according to claim 1, wherein the plurality of portable data carriers are arranged within an alternating magnetic field generated by the personalization device.

5. The method according to claim 1, wherein the plurality of portable data carriers are inserted in a Helmholtz coil of the reading device where the personalization data from the reading device is transmitted to the portable data carriers.

6. The method according to claim 1, wherein the portable data carriers are arranged in the form of a stack.

7. A method for a parallel personalization of a plurality of portable data carriers, each having an integrated circuit for at least one of storing or processing information and a nonvolatile memory, comprising the steps:
    transmitting a personalization signal with personalization data to each of the plurality of portable data carriers from a reading device, and
    storing the transmitted personalization data in the nonvolatile memory of the integrated circuit of each of the portable data carriers,
    wherein the same personalization signal is transmitted simultaneously or at least in a temporally overlapping fashion by the reading device to the portable data carriers,
    wherein the data for personalization are transmitted by the reading device in a contact-type fashion,
    wherein at least one portable data carrier is transported by means of a transport device, which electrically contacts the contact area of the portable data carrier by means of a contacting unit at least temporarily, to a processing station adapted to transmitted personalization data to the portable data carrier.

8. The method according to claim 7, wherein the data are received by the plurality of portable data carriers in a contact-type fashion.

9. The method according to claim 7, wherein for transmitting the personalization signal, electrically conductive connections are established between the reading device and portable data carriers.

10. The method according to claim 7, wherein the personalization of the portable data carrier is carried out within the period of time in which the transport device electrically contacts the contact area.

11. The method according to claim 7, the transport device is temporarily electrically contacted by one of the processing stations, so that an electrically conductive connection is formed between this personalization station and at least one contacting unit of the transport device.

12. The method according to claim 7, wherein for a part of the time interval in which the transport device accommodates the portable data carrier, the contacting unit of the transport device is moved to an inactive position, at which the contacting unit does not contact the contact area of the portable data carrier.

13. The method according to claim 9, wherein the contacting unit of the transport device is disposed in the inactive position at least temporarily during the transport.

14. The method according to claim 7, wherein the portable data carrier is inserted in a slot of the transport device.

15. The method according to claim 7, wherein the personalization signal is received in a contact-type fashion by a plurality of adapter elements respectively accommodating one of the portable data carriers, and is transmitted by the adapter element to the respective, accommodated portable data carrier in a contact-type fashion.

16. The method according to claim 1, wherein after the transmission of the personalization signal, a further personalization signal is transmitted after a predetermined time period.

17. The method according to claim 16, wherein the predetermined period of time is chosen to be at least as long as a processing time expected for the processing of the personalization signal by the portable data carrier.

18. The method according to claim 1, wherein data for initialization are transmitted in the form of data blocks.

19. The method according to claim 18, wherein the data blocks to be transmitted are transmitted in any desired sequence.

20. The method according to claim 1, wherein the personalization data are transmitted in an encrypted state and are decrypted on the data carrier.

21. The method according to claim 1, wherein the plurality of portable data carriers check the personalization data determined on the basis of at least one of the transmitted personalization signal or a memory content generated in the integrated circuit within the framework of the personalization.

22. The method according to claim 21, wherein the checking takes place by means of checksums.

23. The method according to claim 21, wherein the portable data carriers are subjected to an unmodulated field for checking the memory content generated in the integrated circuit within the framework of the personalization.

24. The method according to claim 21, wherein the result of the check is respectively stored in the portable data carriers and/or output by the portable data carriers.

25. The method according to claim 21, wherein the further processing of the portable data carriers is made dependent on the respective checking result.

26. The method according to claim 21, wherein the checking result is output to a test device which evaluates the checking result.

27. The method according to claim 7, wherein the personalization signal is amplified during the transmission from the reading device to the portable data carriers.

28. An apparatus for a parallel personalization of a plurality of portable data carriers, which each have at least one integrated circuit for at least one of storing or processing information as well as a nonvolatile memory, comprising:
a reading device arranged to generate a personalization signal having an antenna device to transmit the personalization signal in a contactless fashion, wherein the reading device is configured to initialize a plurality of portable data carriers simultaneously or at least in a temporally overlapping fashion,
wherein the personalization signal is received in a contactless fashion by at least one adapter element, the at least one adapter element accommodates one of the portable data carriers, and the personalization signal is transmitted to the accommodated portable data carriers by the at least one adapter element via contacts on the portable data carrier provided for connecting a contactless interface,
wherein the plurality of the data carriers is guided through a coil tunnel of the reading device where the personalization data from the reading device is transmitted to the portable data carriers.

29. The apparatus according to claim 28, wherein the reading device is arranged to carry out the personalization by means of a unidirectional protocol, according to which no communication from a portable data carrier to the reading device occurs.

30. The apparatus according to claim 28, wherein within a transmission range of the antenna device an accommodation area arranged to accommodate a plurality of portable data carriers is provided.

31. An apparatus for personalizing a plurality of portable data carriers, which each have at least one integrated circuit for least one of storing or processing information, comprising:
a signal source arranged to generate a personalization signal;
a reading device, wherein the reading device includes contact connectors for contact-type transmission of data to simultaneously initialize a plurality of portable data carriers in parallel; and
at least one adapter element configured to accommodate at least one of the plurality of portable data carriers, and having a first interface arranged to communicate with the reading device, and having a second interface arranged to communicate with the reading device, and having a second interface arranged to communicate with at least one of the plurality of portable data carriers to be accommodated,
wherein the reading device includes contact bars and the at least one adapter element includes contact fields on one side, which contact fields are arranged to interact with the contact bars of the reading device.

32. The apparatus according to claim 31, wherein the reading device includes several contacting devices enabling respective electrically contacting at least one of the plurality of portable data carriers.

33. The apparatus according to claim 31, wherein the contacting devices are connected to the reading device respectively via an intermediate amplifier.

34. The apparatus according to claim 31, wherein a testing device is connected to the contacting devices, which testing device is arranged to evaluate a value output by a contacted portable data carrier.

35. The apparatus according to claim 31, wherein the adapter element comprises a contactless interface arranged to communicate with the reading device in a contactless fashion.

36. The apparatus according to claim 31, wherein the adapter element includes two halves, and comprises an antenna in one half and in another half an accommodation device arranged to accommodate at least one of the plurality of portable data carriers.

37. The apparatus according to claim 31, wherein the first interface comprises one or several contact connectors.

38. The apparatus according to claim 31, wherein the second interface comprises a contactless interface.

39. The apparatus according to claim 31, wherein the second interface comprises one or several contact connectors.

40. The apparatus according to claim 31, including apparatus arranged to transmit via the second interface an RF field received via the first interface in the form of current and voltage.

41. The apparatus according to claim 31, including a container adapted to accommodating several adapter elements in such a fashion that they can be fed to the reading device in the form of a stack.

42. The apparatus according to claim 28, wherein the reading device comprises a device arranged to transmit data for initialization in the form of data blocks.

43. The apparatus according to claim 28, wherein the reading device is arranged to transmit the data blocks in any desired sequence.

44. The apparatus according to claim 28, wherein the reading device comprises an encryption device arranged to encrypt data to be transmitted for initialization.

45. A transport device for transporting at least one portable data carrier from a first to a second processing station of a production facility, comprising at least one contacting unit for electrically contacting a portable data carrier to be transported such that the portable data carrier does not directly contact the first or second processing station.

46. The transport device according to claim 45, wherein the contacting unit is movable between an active position, at which electrical contact with a portable data carrier to be transported is enabled, and an inactive position, at which electrical contact with a portable data carrier to be transported is not enabled.

47. The transport device according to claim 45, wherein the transport device has an external connector which is connected to the contacting unit in an electrically conductive fashion.

48. The transport device according to claim 45, wherein the transport device has several slots adapted to accommodate portable data carriers to be transported.

* * * * *